July 25, 1944.　　B. G. CARLSON ET AL　　2,354,244
METERING DEVICE
Filed Sept. 5, 1942　　2 Sheets-Sheet 1

INVENTORS
BERT G. CARLSON
GROVER TYLER
By Frank N. Harmon
ATTORNEY

July 25, 1944.   B. G. CARLSON ET AL   2,354,244
METERING DEVICE
Filed Sept. 5, 1942    2 Sheets-Sheet 2
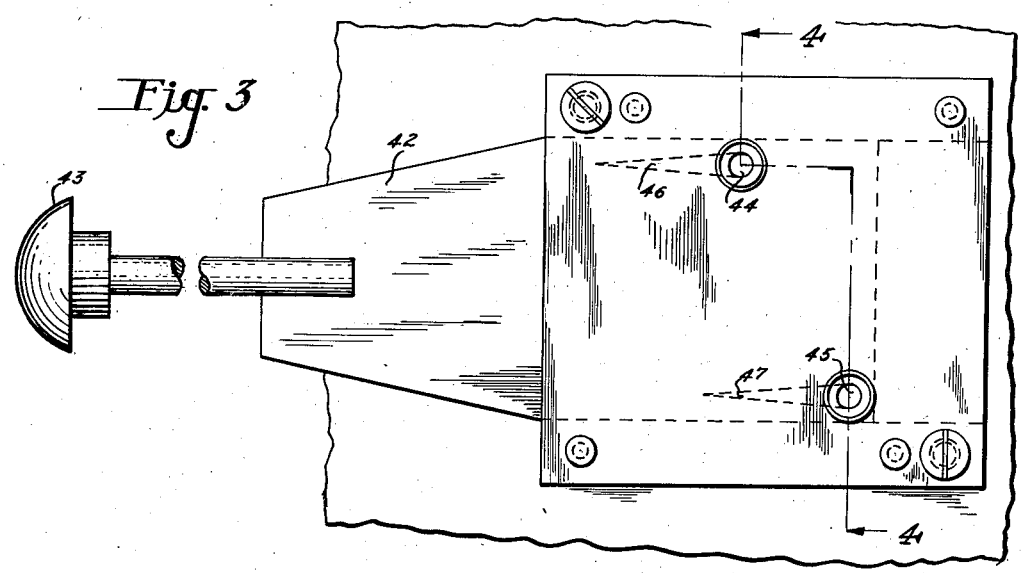
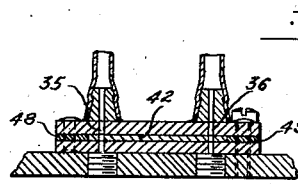
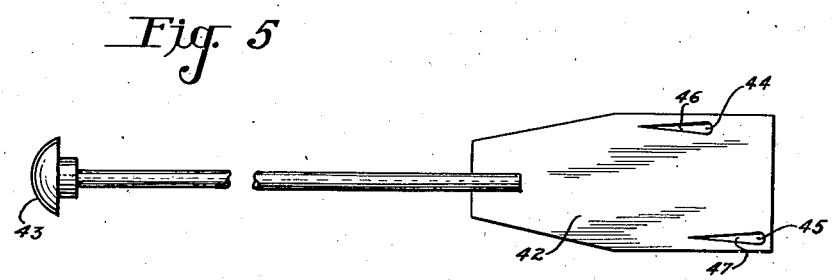
INVENTORS
BERT G. CARLSON
GROVER TYLER
By Frank H. Harmon
ATTORNEY Patented July 25, 1944

2,354,244

UNITED STATES PATENT OFFICE 2,354,244

METERING DEVICE

Bert G. Carlson, Erieside, Ohio, and Grover Tyler, Seattle, Wash., assignors to Jack & Heintz, Inc., Bedford, Ohio, a corporation of Ohio Application September 5, 1942, Serial No. 457,422

1 Claim. (Cl. 244—78)

This invention relates in general to improvements in automatic pilots and more particularly to improvements in the construction and sensitivity of control of the air relay.

Heretofore it has been the conventional practice in hydraulic automatic pilots to employ an air relay, operated by air pick-offs, to operate the balanced oil valve of the hydraulic system, and to have the air relay to consist merely of a diaphragm separating two air chambers provided with air bleeds without any thought of manual or automatic metering of these air bleeds. Due to changes in atmospheric pressure conditions at different altitudes the net effective differential in air pressures within the two chambers of the air relay separated by the diaphragm is bound to vary with a resulting undesired varying of the operation by the air relay of the balanced oil valve of the hydraulic system.

The primary object of the present invention is to overcome this defect by the provision of a simple manual or automatic metering device for simultaneously and equally regulating the rate and volume of air from the atmosphere in through the two air bleeds to the two diaphragm separated air relay chambers, such manual or automatic metering device to correspondingly and equally increase the air intake as the altitude increases and the density of the atmosphere decreases, and vice versa.

With the foregoing and other objects in view, the invention consists in the combination of parts and in the details of construction hereinafter set forth in the following specification and appended claim, certain embodiments thereof being shown in the accompanying drawings, in which:

Figure 3 is an enlarged plan view of the metering valve and its relationship with the ports to be metered taken on line 3—3 of Figure 1;

Figure 4 is a view in section of the valve taken along line 4—4 of Figure 3; and Figure 5 is a top plan view of the metering valve.

Referring more particularly to the drawings, the air relay and the air bleed metering valve will be described in conjunction with an aileron air pick-off of an horizon gyro for ailerons, although it is to be understood that the same is applicable to elevator and rudder air pick-offs with the attending advantages.

Figure 2:
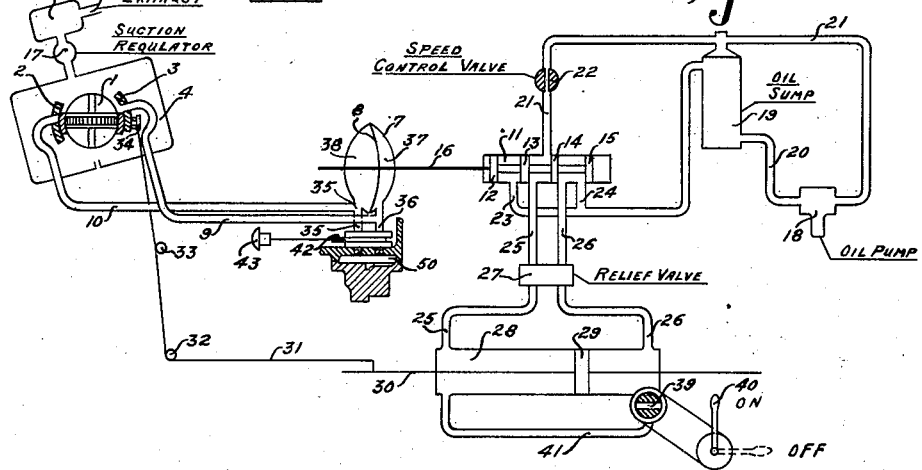
Figure 2 is a schematic view of the air pick-off, air relay and hydraulic system of the automatic pilot.

As schematically shown in Figure 2, the gyro 1 and aileron pick-offs 2 and 3 are placed in a box 4. Air is drawn into the bottom of the box by a suction pump 5, having a suction regulator 17 and an atmosphere exhaust 6, and directed to the gyro to spin the same. Air is also drawn in from the air relay 7, equally on either side of the diaphragm 8 through pipes 9 and 10, when the airplane is level, by suction pump 5. However, when the airplane is in the position as shown in Figure 2, the box is tilted and the air drawn in through pipe 9 only, the port of pipe 10 being closed, as shown.

The hydraulic system includes a balanced oil valve assembly 11 with pistons 12, 13, 14 and 15 which have a common piston rod 16 connected to the air relay diaphragm 8. In circuit with the oil valve is an oil pump 18 pumping oil from the oil sump 19 through pipes 20 and 21 past the speed control valve 22 into the oil valve cylinder 11. Leading from cylinder 11 to the sump 19 are pipes 23 and 24 and also pipes 25 and 26 which lead past servo relief valves 27 into the servo cylinder 28 on either side of the servo piston 29. The servo piston 29 has a rod 30 that is connected to a follow-up cable 31 passing over pulleys 32 and 33 and connected also to the gyro 1 at pulley 34.

The air relay is open to the atmosphere through air-bleed ports 35 and 36 on either side of diaphragm 8. As long as the airplane is level and air is drawn equally through pipes 9 and 10 by the suction pump an equal amount of air is drawn in through pipes 35 and 36 and there is no deflection of diaphragm 8 and thus the pistons 13 and 14 of the oil valve assembly 11 close pipes 25 and 26 and no oil is permitted to flow to the servo cylinder 28. When, however, the airplane changes its lateral attitude to a bank to the left the box tips with respect to the vertical axis gyro as shown in Figure 2, fully opening the port of pipe 9 and fully closing that of pipe 10. This causes air chamber 37 of the air relay to receive increased suction while the suction in chamber 38 falls off.

As previously explained, this causes the movement of the pistons of the oil valve to open to flow of oil to the servo cylinder through pipes 21 and 25 into the left end of the servo cylinder while an equal amount of oil is discharged from the cylinder through pipes 26 and 24 to the oil sump 19. While the human pilot is flying the airplane manually the valve 39, shown closed for operation by the automatic pilot, is opened by the handle 40 so that oil may flow through the by-pass tube 41 and the airplane controls be manually moved.

In controlling an airplane it is not only necessary to apply control to bring the airplane back to level but also to begin to remove the applied control as the airplane is returning to level so that the control surface will be back in neutral when the disturbance has been fully corrected. It is also necessary that the amount of control applied be in proportion to the displacement of the airplane and this is accomplished by the follow-up system. The air pick-offs 2 and 3 are not fixed rigidly to the gyro box or the airplane but may be moved in relation thereto by the follow-up mechanism. This includes the cable 31 which is connected to the servo piston rod 30 and the pulley 34 on the gyro box. Thus when piston 29 moves to the right the cable moves likewise and moves pick-off 2 down and 3 up. When they reach a neutral position, both half open, the air relay and oil valve are centered and the movement of the servo piston away from neutral stopped. The control surface movement produced by the servo brings the airplane back to level flight. As the airplane continues in toward level the air pick-offs which have been driven ahead of the gyro box pass beyond the neutral point and begin to cause servo movement in the opposite direction. The mechanism and its ratios are so arranged that the correct amount of control will be applied and also removed at the proper rate as the airplane returns to level.

With such a delicately balanced system it is of great importance that the functioning of the air relay diaphragm in response to variance of suction and unequalization of air pressure in chambers 37 and 38 must be uniform for all altitudes and all corresponding densities of the atmosphere. Therefore for proper and necessary compensation for varying atmospheric densities means should be provided for lesser rate of ingress of air through the air bleeds into the air relay at lower altitudes and a correspondingly greater rate of ingress of air into the air relay at higher altitudes but no differential with respect to the two air bleeds themselves. For this purpose, as schematically shown in Figure 2, a slidable metering valve 42 fitting between upper and lower guides 51 and 52 with an operating handle is employed which is adapted to simultaneously and equally meter the ingress of air from the air chamber 50 at atmospheric pressure through pipes 35 and 36 into the air chambers 37 and 38 of the air relay.

In its manual form the metering valve, as shown in Figure 5, may comprise a flat plate with two staggered apertures having a rounded portion 44 and 45 and a tapered portion 46 and 47 to register with the air bleed pipes.

Figure 1:
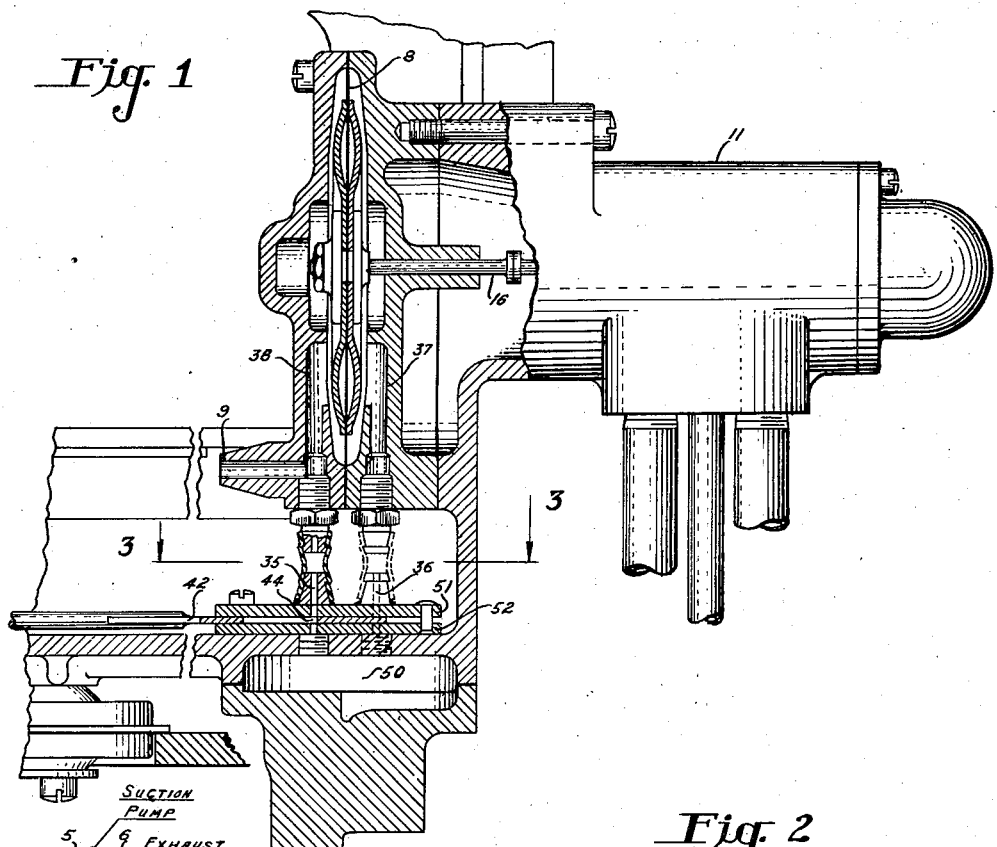
Figure 1 is a view partly in vertical section taken through an air relay and balanced oil valve operated thereby and showing the metering means for the air relay air bleeds.

In a preferred form as shown in Figure 1, the round portion 44 of the valve aperture is shown in registry with air bleed 35 and the rounded portion 45 of the valve aperture is shown in registry with air bleed 36 which is the proper position for maximum flight altitudes where the atmosphere is least dense. A manual movement of the valve by the handle 43 from left to right brings about a simultaneous and equal progressive closing of air bleeds 35 and 36 as such movement of the valve is continued and a consequent increasing of restriction of ingress of air as the tapered portions 46 and 47 are brought into registry with the air bleeds as lower flight altitudes are assumed. It is to be understood that such a valve may be designed as to be automatically operated if desired.

We claim:

In combination in an automatic pilot, a gyro and a pneumatic system including air pick-offs and an air relay, a hydraulic system including a servo motor and a balanced oil valve operated by said air relay, said air relay having air chambers separated by a flexible diaphragm connected to said oil valve, a gyro box for housing said gyro and air pick-offs, lines of communication between the air pick-offs and their respective air chambers of said air relay, said air chambers having restricted ports to atmosphere, a source of suction leading to said box and said air relay, a single valve means having an aperture in registry with each of said restricted ports and a single control means for said valve means, said valve apertures being staggered and uniformly tapered and adapted upon operation of said valve means to be brought jointly into various stages of alignment with said ports to simultaneously, equally and progressively meter the same.

BERT G. CARLSON.
GROVER TYLER.